(12) United States Patent
Zadorozny

(10) Patent No.: US 12,505,494 B2
(45) Date of Patent: Dec. 23, 2025

(54) GENERATING CUSTOMIZED GRAPHICAL ELEMENTS FROM USER-PROVIDED IMAGES

(71) Applicant: Meta Platforms, Inc., Menlo Park, CA (US)

(72) Inventor: Richard Kenneth Zadorozny, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 573 days.

(21) Appl. No.: 17/968,081

(22) Filed: Oct. 18, 2022

(65) Prior Publication Data
US 2024/0127364 A1    Apr. 18, 2024

(51) Int. Cl.
G06Q 50/00    (2012.01)
G06T 17/20    (2006.01)
G06T 19/00    (2011.01)

(52) U.S. Cl.
CPC ............. *G06Q 50/01* (2013.01); *G06T 17/20* (2013.01); *G06T 19/006* (2013.01)

(58) Field of Classification Search
CPC ........ G06Q 50/01; G06T 17/20; G06T 19/006
See application file for complete search history.

(56) References Cited

U.S. PATENT DOCUMENTS

| | | | |
|---|---|---|---|
| 2018/0336714 A1* | 11/2018 | Stoyles | G06V 40/174 |
| 2021/0037195 A1* | 2/2021 | Cutler | H04N 5/272 |
| 2024/0119671 A1* | 4/2024 | Liu | G06T 7/60 |

OTHER PUBLICATIONS

Ashley Mae, "How to Save Stickers from WhatsApp to iphone, Android or Computer", posted on Jan. 25, 2021. https://www.aiseesoft.com/how-to/save-stickers-on-whatsapp.html (Year: 2021).*

* cited by examiner

*Primary Examiner* — Chong Wu
(74) *Attorney, Agent, or Firm* — EVERSHEDS SUTHERLAND (US) LLP

(57) ABSTRACT

Techniques for generating customized graphical elements are described. For example, a social networking system may receive, from a device of an account of a social networking system, an image including at least a portion of a face of a user associated with the account. The social networking system may generate a face mesh including at least a portion of the face depicted in the image, and then may expand the face mesh to include at least a portion of the head of the user other than the face to generate a customized graphical element. The customized graphical element may be further modified, stored, and subsequently shared with one or more other accounts alone and/or in association with one or more content items.

20 Claims, 8 Drawing Sheets

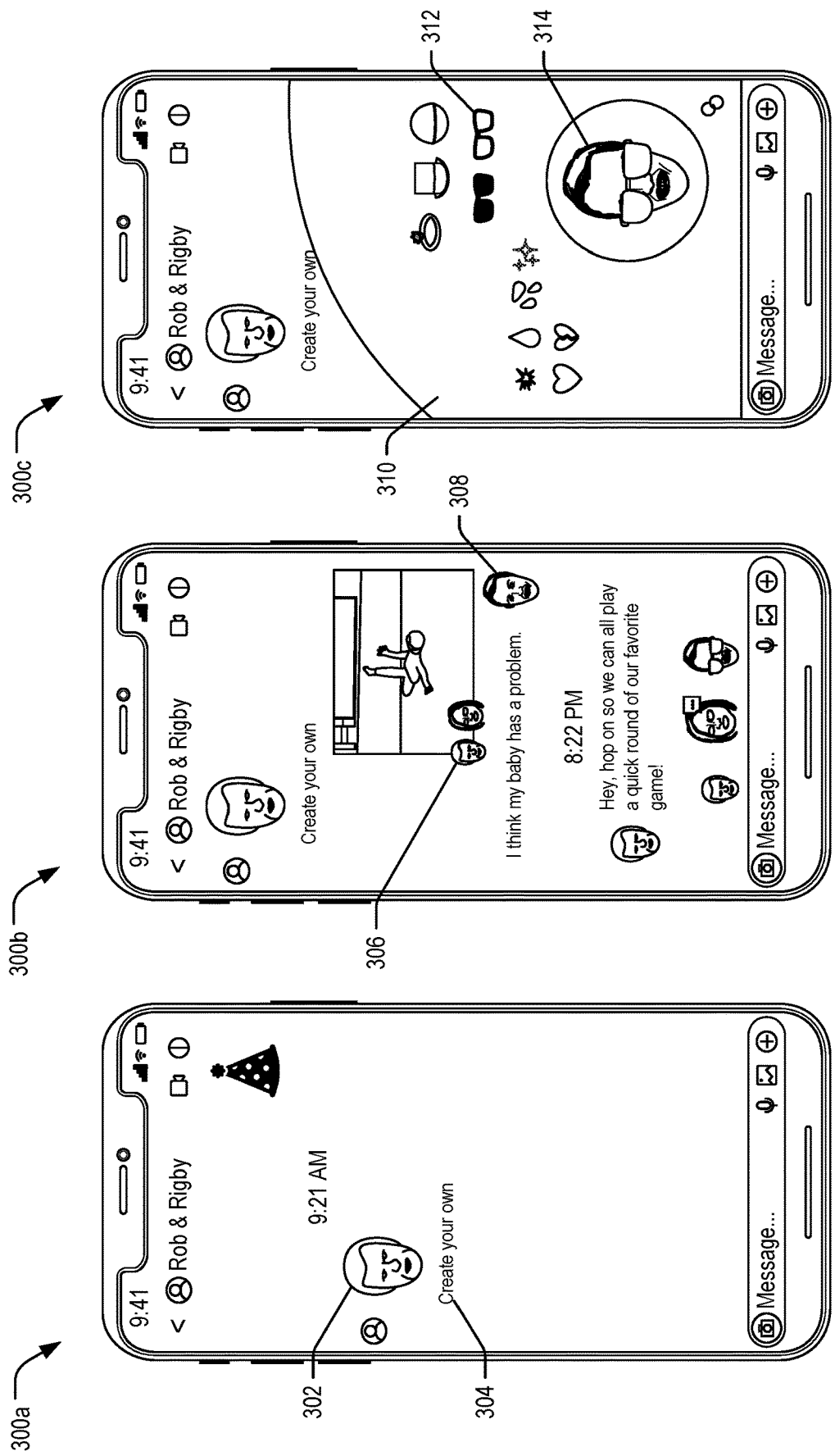

GENERATING CUSTOMIZED GRAPHICAL ELEMENTS FROM USER-PROVIDED IMAGES

BACKGROUND

Digital platforms such as text messaging, instant messaging, email, social media, gaming, or other applications by which users can share content provide users with numerous benefits and opportunities. For instance, users may create and share information, media, and other types of content with family, friends, colleagues, and even strangers. However, the freedom associated with creating and sharing content via these digital platforms is not without problems. Oftentimes, creation of content items to share can be labor intensive, and users may be limited in their ability to customize content items, such as emojis. As such, existing techniques to allow users to generate realistic or user-customized content is limited.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A-3C illustrate example interfaces for applying a customized graphical element to a content item.

DETAILED DESCRIPTION

Figure 1:
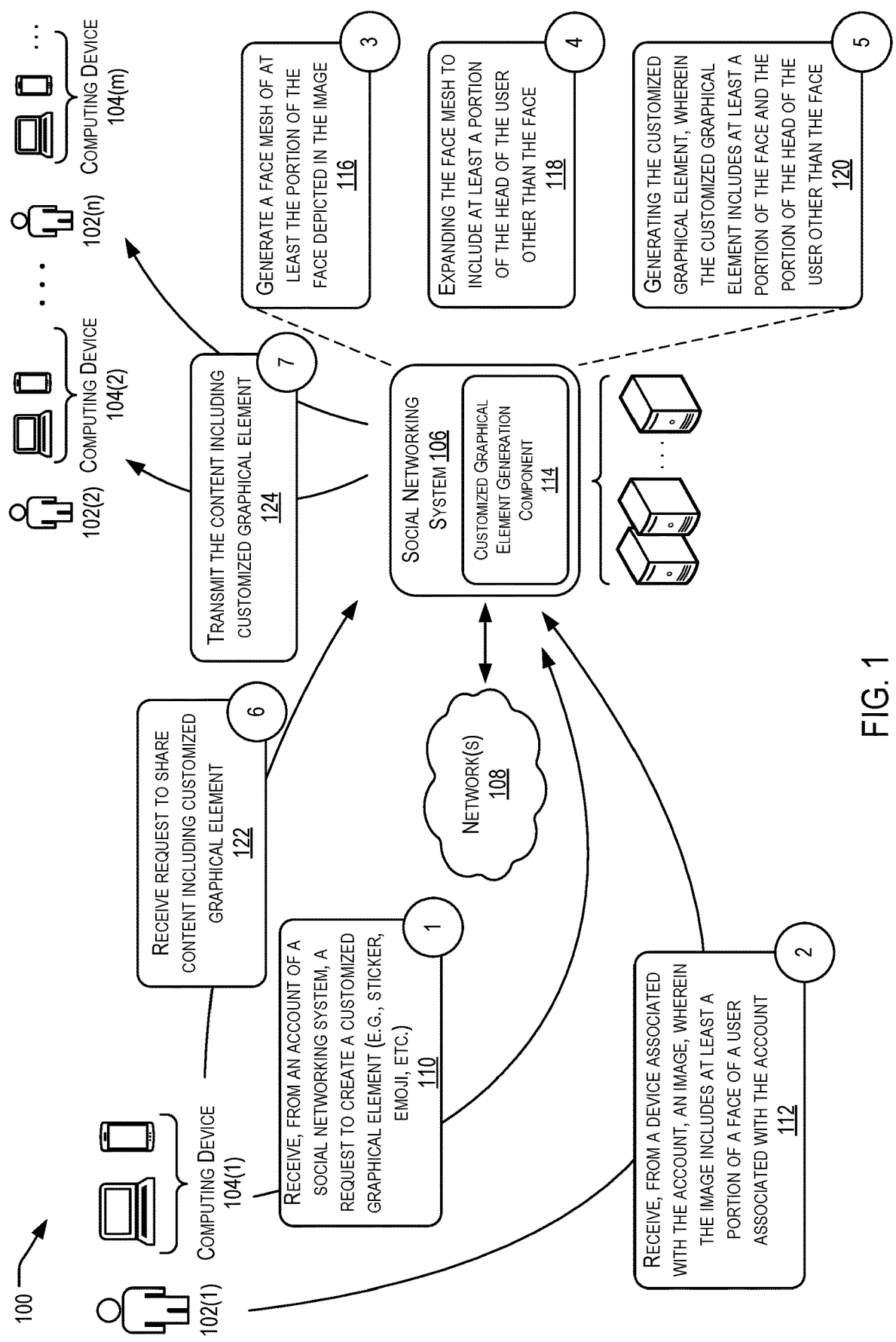
FIG. 1 is a schematic view of an example system usable to implement example techniques described herein.

As discussed above, the ability to create and customize content shared on digital platforms may present challenges. For instance, many social network applications and/or services (herein referred to as "social networking systems") allow accounts to create and/or customize content to share with other accounts. One way in which accounts may customize content is by adding existing graphics or customizations provided by the social networking system. In some cases, these existing customizations may include emojis, which may allow accounts to customize a digital icon to resemble their own physical features. In some examples, emojis may be applied as stickers, such as graphic overlays, filters, extended reality elements, and other computer-generated elements. For example, a social networking system may generate various stickers for accounts to add as decorative elements to their content. However, while emojis and stickers may allow accounts to personalize their content, accounts typically have limited ability to edit or customize these elements.

Existing options for customizing emojis have been inadequate. For instance, the current techniques allow accounts to customize emojis by presenting options associated with physical characteristic that a user associated with an account may select to resemble their own physical features. These options may include the ability to select a hair color (e.g., brown, black, blonde), a length of hair (e.g., long, medium, short, bald), a size of a nose (e.g., small, medium, large), or an eye color (e.g., brown, blue, green), for example. However, these options are limited in choice and selection, and prohibit accounts from truly customizing emojis to resemble themselves. Additionally, accounts are limited in their ability to capture their unique physical features, discouraging accounts from expressing their creativity and connecting with one another. Moreover, current techniques for emoji functionality are lacking as well. For example, a user associated with an account may wish for their emoji to interact with their environment, such as a virtual environment or other users interacting with the emoji. However, current emojis are limited in their ability to interact, and are often presented as a static, stand-alone item. Thus, users are limited in their creative expression as they curate and share content.

This application describes techniques for allowing content creators the ability to generate customized emojis (herein referred to as "customized graphical elements"). For instance, the techniques described herein may allow accounts to generate a face mesh from an image of their face and apply AR filters to the face web mesh to generate content items customized to their unique features. These customized graphical elements may be shared via the social networking system as content items and/or may be used to interact with a dynamic environment, such as an avatar in a game. As such, these techniques allow accounts to easily and effortlessly generate content customized to their unique physical features, creating a cohesive and seamless social presence.

Various examples of the present disclosure include systems, methods, and non-transitory computer-readable media of a social networking system. In some examples, a social networking system may receive, from an account of a social networking system, a request to create a customized graphical element. A customized graphical element may be a static and/or a dynamic graphic design element which may be generated via the social networking system to increase aesthetic appeal and/or foster engagement with other accounts. For example, a graphical element may be a sticker, which may include a graphic design element which may be added to a content item of the social networking system to increase aesthetic appeal and/or foster engagement with other accounts. In other examples, the customized graphical element may be configured to dynamically interact with elements of the social networking system, such as other accounts and/or other customized graphical elements of the social networking system.

In some examples, the social networking system may receive, from a device associated with the account, an image, wherein the image includes at least a portion of a face of a user associated with the account. The image may be supplied from storage of a device of a user associated with the account and/or from a camera of the device. Additionally or alternatively, the image may be supplied from a platform associated with the social networking system, such as an image previously received from the account on a first platform and/or a second platform associated with the social networking system. In some examples, the image may include at least a portion of a face of the user associated with the account.

In some examples, the social networking system may generate a face mesh of at least the portion of the face depicted in the image. A face mesh may be, for example, a 3-dimensional (3D) model of a face taken from an image of a face which may create a surface that reconstructs one or more expressions of an individual. The face mesh may be generated to include a portion of a face of a user associated with the account to include at least an area below eyebrows of a user, along cheekbones of the user, and/or to a chin of the user. However, other areas of the face may be captured by the face mesh.

In some examples, the social networking system may expand the face mesh to include a portion of a head of the user other than the face. For example, the social networking system may expand the face mesh to include at least a portion of the head of the user other than that initially captured by the face mesh. This may include expanding the face mesh to include, for example, hair and/or ears of the user associated with the account, allowing the social networking system to capture recognizable and distinguishing physical qualities of a user, generating an accurate face mesh of a user and their dominant features.

In some examples, the social networking system may generate the customized graphical element, wherein the customized graphical element includes at least the portion of the face and the portion of the head of the user associated with the account other than the face. For example, the customized graphical element may include the augmented reality filter applied to the expanded face mesh, creating an interactive element customized the user associated with the account.

These and other aspects are described further below with reference to the accompanying drawings. The drawings are merely example implementations, and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to enable users associated with accounts of a social networking system to generate customized graphical elements. In some examples, the computing system 100 may include accounts 102(1), 102(2), . . . 102(n) (collectively "accounts 102") that are associated with users and interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer-executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), wearable devices (e.g., augmented reality or virtual reality devices, glasses, watches, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer-executable instructions to implement the functionality discussed herein attributable to the social networking system 106 or digital platform. The social networking system 106 may enable accounts 102 associated with its users (such as persons or organizations) to interact with the social networking system 106 and with each other via the computing devices 104. The social networking system 106 may, with input from a user, create and store in the social networking system 106 a user account associated with the user. The user account may include demographic information, communication-channel information, financial information and information on personal interests of the user. The social networking system 106 may also, with input from a user, create and store a record of relationships of the user with other users of the social networking system 106, as well as provide services (e.g., posts, comments, photo-sharing, messaging, tagging, mentioning of other users or entities, games, etc.) to facilitate social interaction between or among the accounts 102.

In some examples, the social networking system 106 may be associated with multiple platforms. For example, although the current application is described with respect to a single platform associated with the social networking system 106, such as a first platform, the techniques described herein may be applied to any number of platforms associated with the social networking system 106. A second platform, for example, may be administered by the same entity as the first platform or may be administered by separate/unrelated entities. For example, the user may have an account on two platforms offered by the same company, or two separate unrelated platforms offered by separate companies. The platforms may be of a same type (e.g., social networking platforms) or they may be different types (e.g., a social networking platform, a gaming platform, a merchant platform, etc.). In some examples, a user may use a single user account to access multiple separate platforms associated with the social networking system 106.

The social networking system 106 may be configured to generate customized graphical elements, allowing users associated with accounts 102(n) of social networking systems the ability not only to customize graphical elements to realistically and accurately resemble themselves, but to curate an online experience tailored toward each, individual user. For example, at operation 110 (indicated by "1"), the social networking system 106 may receive, from a first account 102(1) of the social networking system 106, a request to create a customized graphical element. The social networking system 106 may receive the request to create the customized graphical element as a scroll gesture, a swipe gesture, and/or a tap gesture, to name a few examples.

In some examples, the customized graphical element may be a static and/or a dynamic graphic design element which may be sent via the social networking system 106 to increase aesthetic appeal and/or foster engagement with other accounts 102. For example, a customized graphical element may be a sticker, which may include a graphic design element which may be added to a content item of the social networking system 106. In some examples, the customized graphical element may include an animation, such as a GIF. In other examples, the customized graphical element may be configured to interact with and respond to elements of the social networking system 106. Customized graphical elements are described in further detail, below.

At operation 112 (indicated by a "2"), the social networking system 106 may receive, from a device 104(1) associated with the first account 102(1), an image. The image may be supplied from storage of the device 104(1) and/or from a camera of the device 104(1). Additionally or alternatively, the image may be supplied from a platform associated with the social networking system 106, such as an image previously received from the first account 102(1) on the first platform and/or the second platform. In some examples, the image may include at least a portion of a face of the user associated with the first account 102(1). For example, in response to receiving a request to create a graphical element by the first account 102(1), the social networking system 106 may cause presentation, on the device 104(1) of the user associated with the first account 102(1), of a front-facing camera, such that the device 104(1) may depict at least a portion of the user associated with the first account's 102(1) face.

In some examples, in response to receiving the image from the first account 102(1), the social networking system 106 may analyze the image to determine that the image contains at least a portion of a face of the user associated with the first account 102(1). For example, the social networking system 106 may input the image into a machine-learned model trained to detect faces (or portions herein). In some examples, the machine-learned model may build a mathematical model using training data that includes images including at least a portion of a face. For example, training data may include images of human faces having different features, such as skin tone, facial characteristics (e.g., eye shape, eye size, eye slant, nose width, nose length, mouth curvature, mouth width, mouth openness, pupil size, etc.), and complexion, to name a few non-limiting examples. Using the images as training data, the machine-learned model may be trained to label images as images including at least a portion of a face, as the images are received by the social networking system 106.

In some examples, the social networking system 106 may receive multiple images from the first account 102(1) and may select a single image as an optimal image. For instance, in an example in which the social networking system 106 receives an image from the first account 102(1) via a camera associated with the device 104(1), the social networking system 106 may prompt the user associated with the first account 102(1) to take multiple images (e.g., two images, three images, etc.), wherein each image may include at least a portion of the face of the user associated with the first account 102(1).

Upon receiving the multiple images, the machine learning model of the social networking system 106 may analyze the multiple images to determine an optimal image. For instance, the social networking system 106 may input the image into a machine-learned model trained to determine an optimized image. In some examples, the machine-learned model may build a mathematical model using training data that includes images previously sent to the social networking system 106. For example, training data may include one or more images including at least a portion of faces associated with users that may be used or have been used to generate graphical elements. Using the training data, the machine-learned model can be trained to identify images that may be better than other images to be used to generate a graphical element. For example, optimal images may be images that contain a larger portion of a face of a user, have a higher image quality, or depict centered in the image, to name a few examples. In some examples, the social networking system 106 may determine that the image received from the first account 102(1) is not an optimal image, and the social networking system 106 may send, to the first account 102(1), an indication to retake and/or select a different image.

In other example, the social networking system 106 may receive multiple images from the first account 102(1) and may combine the multiple images to create a composite image. For example, continuing with the example above in which the social networking system 106 receives an image from the first account 102(1) via a camera associated with the device 104(1), the social networking system 106 may prompt the user associated with the first account 102(1) to take multiple images (e.g., two images, three images, etc.), wherein each image includes a different angle of the face of the user associated with the first account 102(1). For example, the social networking system 106 may prompt the user associated from the first account 102(1) to take three images. The three images may include a first image taken at a straight-on angle, wherein the face of the user associated with the first account 102(1) is level; a second image taken at a first angle, wherein the face of the user associated with the first account 102(1) is tilted to the left; and a third image taken at a second angle, wherein the face of the user associated with the first account 102(1) is tilted to the right. In some examples, the system may prompt the user to take images from one or more additional or alternative angles (e.g., head titled up, down, etc.). Based at least in part on receiving the multiple images, the social networking system 106 may input the multiple images into the machine-learned model, which may combine the multiple images into a composite image. The composite image may include details of the face of the user associated with the first account 102(1) captured in the first image, the second image, and/or the third image, resulting in a more accurate and detailed composite image from which a face mesh may be generated, as described below.

Additionally, or alternatively, the social networking system 106 may utilize multi-exposure high dynamic range (HDR) capture techniques to combine multiple exposures of multiple images. In some examples, this process may be automatic and may occur at the time the image(s) are taken. For example, the camera of the device 104(1) may allow for manual exposure control and may automatically apply multi-exposure HDR capture when the user associated with the first account 102(1) captures one or more images. In other examples, the process may be manual. For example, the social networking system 106 may prompt the user associated with the first account 102(1) to take multiple images, wherein each image of the multiple images has a different exposure. An image manipulation component of the social networking system 106 may then merge the multiple images into a single HDR image.

The machine-learned model may take a variety of forms. For instance, the machine-learned model may be a computer-vision classifier trained to analyze images and/or video (e.g., a frame and/or frames of a video) for images and/or videos that may be associated with one or more topics. The computer-vision classifier, in some examples, may be an artificial neural network trained to analyze images. For example, the machine-learned model may receive one or more images from the first account 102(1) and using key images, output a score associated with a likelihood the image should be used to generate a customized graphical element. The machine-learned model may compare the one or more scores, and based at least in part on determining, the highest score associated with an image, designate that image as an image as a desirable image for generating a customized graphical element.

Although specific machine-learned models are described above, other types of machine-learned models can additionally or alternatively be used. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

At operation 116 (indicated by a "3"), the social networking system 106 may generate a face mesh of at least a portion of the face depicted in the image. For example, the face mesh may be a 3-dimensional (3D) model of a face taken from an image of a face which may create a surface that reconstructs one or more expressions of an individual. The social networking system 106 may utilize applications such as a face tracker and/or Spark AR Studio to generate the face mesh. In some examples, the social networking system 106 may be configured generate a face mesh including one or more facial features. For example, the face mesh may be generated to include a portion of a face of a user to include at least an area below eyebrows of a user, along cheekbones of the user, and/or to a chin of the user. However, other areas of the face may be captured by the face mesh. In this way, the face mesh is expanded to wrap around the face of a user, encompassing the head of the user, such that regardless of a tilt or rotation of the head, the face mesh may still encompass a majority of the face.

At operation 118 (indicated by a "4"), the social networking system 106 may expand the face mesh to include at least a portion of a head of the user other than the face. For example, as described above, the face mesh may include an area of a face below eyebrows, along cheekbones, and to a chin of a user. Thus, the social networking system 106 may expand the face mesh to include at least a portion of the head of the user other than that initially captured by the face mesh. This may include expanding the face mesh to include, for example, hair, the bottom of the chin, the neck, and/or ears of the user, allowing the social networking system 106 to capture recognizable and distinguishing physical qualities of a user, generating an accurate face mesh of a user and their dominant features. In some examples, expanding the face mesh may include merging the expanded face mesh with the initial face mesh. In other words, the face mesh of at least the portion of the face depicted in the image may be merged with the face mesh including at least a portion of the head of the user other than the face.

In some examples, the social networking system 106 may additionally or alternatively edit and/or alter the image including the face mesh including at least a portion of the head of the user other than the face to more accurately resemble the face of the user. For example, the social networking system 106 may trim one or more borders of the image, add a natural pattern, and/or alter a length of hair such that the social networking system 106 may generate an accurate image of the user associated with the account 102(1).

At operation 120 (indicated by a "5"), the social networking system 106 may generate the customized graphical element, which may include at least a portion of the face and the portion of the head of the user other than the face. For example, a customized graphical element generation component 114 of the social networking system may combine the portion of the face mesh including at least a portion of the face depicted in the image and the portion of the face mesh expanded to include at least a portion of the head of the user other than the face to generate the customized graphical element. In this way, the social networking system 106 may generate a surface corresponding to a face of a user, providing a realistic and accurate model of the user's face which the social networking system 106 may further customize and build upon to create content that is not just engaging and inviting, but personalized to each individual user of the social networking system 106.

In some examples, generating the customized graphical element may include normalizing the face mesh. For example, upon receiving the image from the first account 102(1), the social networking system 106 may detect a facial feature of the user depicted in the image, such as, for example, an eye, a nose, or a mouth. The social networking system 106 may then normalize the face mesh around the facial feature. This may include centering the face mesh, rotating the face mesh, or resizing the face mesh, to name a few non-limiting examples. For example, rotating the face mesh may include rotating the image depicting the head around a center of the face (e.g., around a midpoint of the eyes of the head of the user). Normalizing the image may also include editing the image itself, such as adjusting a contrast of the image, a brightness of the image, a glare of the image, an intensity of the image, or smoothing the image, for example.

In some examples, the social networking system 106 may scale the image such that an on-canvas (e.g., the area of the image) distance between a head position of the user depicted in the image (e.g., a nose of the user) and a top of a forehead of the user depicted in the image is a portion of the entire canvas height (e.g., 25% of the canvas height, 27.5% of the canvas height, 30% of the canvas height, etc.). Thus, the social networking system 106 may calibrate the image of the face of the user such that it may appear more realistic and increase aesthetic.

At operation 122 (indicated by a "6"), the social networking system 106 may receive, from the first account 102(1), a request to share content including the customized graphical element. Content, such as a content item, may take a variety of forms. For example, content may include a profile or feed post, a story, a direct message to one or more other accounts, a reel, a tweet, or a snap, to name a few examples. In general, a profile (or feed) post may include text and/or media content items, such as images, video, and/or audio. The profile post may be published to the social networking system 106 by an account, such as the account 102(1), for consumption by other accounts 102(2)-102(n), and may be viewable by the other accounts 102(2)-102(n) for as long as the account 102(1) is active and/or until the post is deleted by the account 102(1), although examples are considered in which the profile post is removed and/or deleted after an amount of time (e.g., one hour, one day, one week, etc.). In some cases, a profile post shared by the account 102(1) may be included in respective content feeds of other the accounts 102(2)-102(n) of the social networking system 106 that have "followed" the first account 102(1), are "friends" with the account 102(1), are connections of the account 102(1) or are otherwise associated with the account 102(1).

A story may be similar to a profile post, in that the story may include text and/or media content items, such as images, video, and/or audio, is published to the social networking system 106 by the account 102(1) for consumption by the other accounts 102(2)-102(n), and may be included in a feed (although, in some cases, a separate feed from the profile post feed). However, a story may differ from a profile post in that the story may be shared only with a selected subset of the account's 102(1) followers, and/or may be removed from being viewed by followers of the account 102(1) after a certain period of time (e.g., one hour, one day, one week, etc.). A direct message may also include text and/or media content items, such as images, video, and/or audio, but in general, a direct message is shared with a single other account 102(n) of the social networking system 106, or a selected subset of other accounts 102(2)-102(n) of the social networking system 106 rather than shared with all of an account's 102 followers.

At operation 124 (indicated by a "6"), the social networking system 106 may transmit the content including the customized graphical element to a second account 102(2) of the social networking system 106. For example, and as described above, the social networking system 106 may send, to the second account 102(2) a direct message, a feed post, a story, or a comment, to name a few non-limiting examples. Thus, the first account 102(1) may easily communicate with other accounts 102(n) of the social networking system in a personalized manner.

In some examples, the social networking system 106 may apply effects to one or more customized graphical elements. For example, the social networking system 106 may receive, from the first account 102(1), a request to generate one or more additional customized graphical elements. The social networking system 106 may then present, to the first account 102(1), one or more available augmented reality filters usable to augment the customized graphical element. An augmented reality filter may be a computer generated effect which may be superimposed on one or more images. For example, an augmented reality filter may include one or more aminated graphics applied to the foreground and/or background of an image to add one or more layers of imagery. However, an augmented reality filter may additionally and/or alternatively include a static image, such as a graphic, a drawing, an image, or a sticker, to name a few examples. Augmented reality filters and customized graphical elements are described in more detail, below.

Upon presenting the one or more available augmented reality filters to the first account 102(1), the social networking system 106 may receive, from the first account 102(1), a selection of a selected augmented reality filter from among the one or more available augmented reality filters. The social networking system 106 may then apply the selected augmented reality filter to the customized graphical element to obtain a modified graphical element. In some examples, the social networking system 106 may store the modified graphical element in a sticker tray such that the user associated with the first account 102(1) may easily access the modified graphical element.

In some examples, the social networking system 106 may generate a preview of the augmented reality filter applied to the graphical element. As described above, augmented reality filters may be static images, such that they appear as a still image. In this instance, the social networking system 106 may determine a preview of the augmented reality filter is the still image of the static augmented reality filter applied to the customized graphical element. However, in other examples, an augmented reality filter may include one or more dynamic elements, such as GIFs and animations, which may alter an appearance of the customized graphical element over a period of time. Thus, the social networking system 106 may determine one or more still image frames of the customized graphical element over the period of time and determine an image from the one or more still images that accurately represents the augmented reality filter. As an illustrative example, the augmented reality filter applied to a customized graphical element may depict a user blowing a bubble of gum. The social networking system 106 may determine multiple still images include various stages of the bubble growing, and ultimately the bubble popped. Thus, the social networking system 106 may select, as a preview of the augmented reality filter, the still image of the user blowing the bubble at the bubble's largest size, before the bobble pops. In this way, accounts 102(n) are provided with accurate previews of dynamic augmented reality filters they may choose to apply to their customized graphical elements.

In some examples, such as after applying an augmented reality filter to a customized graphical element, the first user of the first account 102(1) may wish to share the customized graphical element via the social networking system 106. This may include, for example, requesting apply the customized graphical element to a content item, which is described above. For example, the customized graphical element may be applied as a sticker and may overlay a content item, such as a post or an ephemeral content item, to increase aesthetic appeal of content. The customized graphical element, similar to a sticker, may be accessible via one or more platforms associated with the social networking system 106 and may be available for accounts 102 of the social networking system 106 to use.

In other examples, the customized graphical element may be shared to as a reaction or a comment. Thus, rather than merely increasing aesthetic appeal, the customized graphical element may be used to foster engagement and/or communicate with other users of other accounts 102(n) of the social networking system 106 in the absence or addition to text. For example, the customized graphical element may be sent as a comment itself, similar to that of an emoji or a GIF. In other examples, the customized graphical element may be sent as a reaction, such as a reaction to an ephemeral content item, a reaction to a comment, or a reaction to a direct message, to name a few non-limiting examples.

In other examples, the customized graphical element may be an interactive item, such that it may interact with other content on the social networking system 106. For example, the social networking system 106 may associate an action with the customized graphical element. An action may include, for example, a selection of the customized graphical element, such as a double tap, a like, or a comment, to name a few non-limiting examples.

The social networking system 106 may then receive an input from a second account 102(2) in association with the customized graphical element. Based at least in part on receiving the input from the second account 102(2), the social networking system 106 may cause performance of the action associated with the customized graphical element in reaction to the input from the second account 102(2).

In some examples, the action associated with the customized graphical element may be different in different scenarios. For example, the action may be a first action of multiple actions. In some examples, causing performance of the action associated with the customized graphical element in reaction to the input from the second account may be based at least in part on a type of content to which the customized graphical element is applied.

Additionally, or alternatively, the performance of the action associated with the customized graphical element in reaction to the input from the second account may be based at least in part on a relationship of the second account 102(2) to the first account 102(1). A relationship between the second account 102(2) and the first account 102(1) may include being a follower of an account, following an account, being a close friend of an account, to name a few non-limiting examples.

As an illustrative example, the first account 102(1) may apply a customized graphical element to a content item, such as an ephemeral content item. The social networking system 106 may then receive, from the first account 102(1) an indication to associate a first action, such as the customized graphical item waving hello, with a first action by a second account 102(2), such as the user associated with the second account 102(2) tapping the customized graphical element. The first account 102(1) may specify that the second account 102(2) may include any friend and/or follower of the first account 102(1) on the social networking system.

However, the first account 102(1) may wish to further personalize the customized graphical element applied to the ephemeral content item and may designate a different action with a third group of accounts, such as close friends of the first account 102(1). Thus, the social networking system 106 may receive, from the first account 102(1), an indication to associate a second action, such as the customized graphical element blowing a kiss, with a second action by the third account 102(3), such as the third account 102(3) tapping the customized graphical element. The first account 102(1) may specify that the third account 102(3) is a close friend of the first account 102(1). In this way, the first account 102(1) may further modify the customized graphical element, tailoring certain interactions and reactions of the customized graphical element to designated accounts.

In some examples, the first account 102(1) may wish to further modify the customized graphical element. For example, the social networking system 106 may receive, from the first account 102(1), a request to modify the customized graphical element. The social networking system 106 may then cause presentation of an interface usable to modify the customized graphical element. An interface may be a separate interface and may include one or more controls associated with modifying the customized graphical element.

Modifications may include any change to one or more elements of the customized graphical element. For example, a customized graphical element may have multiple elements, such as one or more shapes, texts, or images. Thus, a modification to a customized graphical element may include a change to a font (e.g., a change in a font type, a font color, a font size, a text of a font, an alignment of a text, etc.), a change to a shape (e.g., a change in a shape size, a shape color, a shape outline, etc.), or a change to an image (e.g., an image type, an image filter, an image size, an image opacity, an etc.). Modifications may also include a change to a relationship between elements, such as bringing an element to a foreground or moving an element to a background or animating an element.

In some examples, modifications may include an addition of and/or a removal of an element. For example, a modification may include an addition of a drawing (e.g., a freehand drawing), an addition of audio (e.g., at least a portion of a song, a voice recording, etc.), an addition of a new customized graphical element (e.g., an item of clothing, a facial feature, an accessory, etc.), or a removal of at least a portion of an element, to name a few examples.

In some examples, the social networking system may receive, from the first account 102(1), user input via the control to modify the customized graphical element to obtain one or more modified graphical elements. The social networking system 106 may then store the one or more modified graphical elements in association with the customized graphical element in the sticker tray, allowing the user associated with the first account 102(1) to access the one or more modified graphical elements for later modification and/or application to the social networking system 106.

It may be noted that while the techniques described above (e.g., at operations 110, 112, 116, 118, 120, 122, and/or 124) are described as being performed at the social networking system 106, the techniques described herein may be performed on a device associated with a user of the first account 102(1) and via the social networking system 106.

For example, analyzing the image to determine that the image contains at least a portion of a face of the user associated with the first account 102(1) may occur on the device 104(1). Similarly, generating a face mesh, expanding the face mesh, and generating a customized graphical element may occur at the device 104(1). For example, the social networking system 106 may revive, from a user associated with the first account 102(1) and at the device 104(1) associated with the first account 102(1), a request to receive one or more effects. Based at least in part on receiving the request, the social networking system 106 may facilitate a download of one or more AR effects on the device 104(1), which may contain one or more machine-learned models, such as that described above. The user associated with the first account 102(1) may then input an image into the AR effect, which may in turn analyze the image to determine the image is a suitable image ang generate the face mesh, expand the face mesh, and/or generate the customized graphical element. This process may be repeated for any number of AR effects, such that any number of graphical elements may be generated via the device 104(1).

In some examples, the social networking system 106 may provide privacy features to the accounts 102. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular account or other entity to access that object, the object may be described as being "visible" with respect to that account or other entity. As an example, and not by way of limitation, an account of the social networking system 106 may specify privacy settings for a account-profile page that identify a set of accounts that may access work-experience information on the account-profile page, thus excluding other accounts from accessing that information.

In particular examples, privacy settings for an object may specify a "blocked list" and/or a "restricted list" of accounts or other entities that should not be allowed to access certain information associated with the object. In particular examples, the blocked list may include third-party entities. The blocked list or restricted list may specify one or more accounts or entities for which an object is not visible. As an example, and not by way of limitation, an account may specify a set of accounts who may not access photo albums associated with the account, thus excluding those accounts from accessing the photo albums (while also possibly allowing certain accounts not within the specified set of accounts to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by accounts tagged in the photo and friends of the accounts tagged in the photo. In particular examples, privacy settings may allow accounts to opt in to or opt out of having their content, information, or actions stored/logged by the social networking system 106 or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other accounts of the online social network. Similarly, the privacy settings applied to a particular node may control whether the account or concept corresponding to the node is visible to other accounts of the online social network. As an example, and not by way of limitation, the first account 102(1) may share an object to the social networking system 106. The object may be associated with a concept node connected to an account node of the first account 102(1) by an edge. The first account 102(1) may specify privacy settings that apply to a particular edge connecting to the concept node of the object or may specify privacy settings that apply to all edges connecting to the concept node. As another example and not by way of limitation, the first account 102(1) may share a set of objects of a particular object-type (e.g., a set of images). The first account 102(1) may specify privacy settings with respect to all objects associated with the first account 102(1) of that particular object-type as having a particular privacy setting (e.g., specifying that all images posted by the first account 102(1) are visible only to friends of the first account 102(1) and/or accounts tagged in the images).

In particular examples, the social networking system 106 may present a "privacy wizard" (e.g., within a webpage, a module, one or more dialog boxes, or any other suitable interface) to the first account 102(1) to assist the first account 102(1) in specifying one or more privacy settings. The privacy wizard may display instructions, suitable privacy-related information, current privacy settings, one or more input fields for accepting one or more inputs from the first account 102(1) specifying a change or confirmation of privacy settings, or any suitable combination thereof. In particular examples, the social networking system 106 may offer a "dashboard" functionality to the first account 102(1) that may display, to the first account 102(1), current privacy settings of the first account 102(1). The dashboard functionality may be displayed to the first account 102(1) at any appropriate time (e.g., following an input from the first account 102(1) summoning the dashboard functionality, following the occurrence of a particular event or trigger action). The dashboard functionality may allow the first account 102(1) to modify one or more of the first account 102(1)'s current privacy settings at any time, in any suitable manner (e.g., redirecting the first account 102(1) to the privacy wizard).

Privacy settings associated with an object may specify any suitable granularity of permitted access or denial of access, including the "restrict" functionality described herein. As an example and not by way of limitation, access or denial of access may be specified for particular accounts (e.g., only me, my roommates, my boss), accounts within a particular degree-of-separation (e.g., friends, friends-of-friends), account groups (e.g., the gaming club, my family), account networks (e.g., employees of particular employers, students or alumni of particular university), all accounts ("public"), no accounts ("private"), accounts of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers may be authorization/privacy servers for enforcing privacy settings. In response to a request from an account (or other entity) for a particular object stored in a data store, the social networking system 106 may send a request to the data store for the object. The request may identify the account associated with the request and the object may be sent only to the account (or a client system of the account) if the authorization server determines that the account is authorized to access the object based on the privacy settings associated with the object. If the requesting account is not authorized to access the object, the authorization server may prevent the requested object from being retrieved from the data store or may prevent the requested object from being sent to the account. In the search-query context, an object may be provided as a search result only if the querying account is authorized to access the object, e.g., if the privacy settings for the object allow it to be surfaced to, discovered by, or otherwise visible to the querying account. In particular examples, an object may represent content that is visible to an account through a newsfeed of the account. As an example, and not by way of limitation, one or more objects may be visible to a account's "Trending" page. In particular examples, an object may correspond to a particular account. The object may be content associated with the particular account or may be the particular account's account or information stored on the social networking system 106, or other computing system. As an example, and not by way of limitation, a first account 102(1) may view one or more second accounts of an online social network through a "People You May Know" function of the online social network, or by viewing a list of friends of the first account 102(1). As an example, and not by way of limitation, a first account 102(1) may specify that they do not wish to see objects associated with a particular second account in their newsfeed or friends list. If the privacy settings for the object do not allow it to be surfaced to, discovered by, or visible to the account, the object may be excluded from the search results. Although this disclosure describes enforcing privacy settings in a particular manner, this disclosure contemplates enforcing privacy settings in any suitable manner.

In particular examples, different objects of the same type associated with an account may have different privacy settings. Different types of objects associated with an account may have different types of privacy settings. As an example, and not by way of limitation, a first account 102(1) may specify that the first account 102(1)'s status updates are public, but any images shared by the first account 102(1) are visible only to the first account 102(1)'s friends on the online social network. As another example and not by way of limitation, an account may specify different privacy settings for different types of entities, such as individual accounts, friends-of-friends, followers, account groups, or corporate entities. As another example and not by way of limitation, a first account 102(1) may specify a group of accounts that may view videos posted by the first account 102(1), while keeping the videos from being visible to the first account 102(1)'s employer. In particular examples, different privacy settings may be provided for different account groups or account demographics. As an example, and not by way of limitation, a first account 102(1) may specify that other account who attend the same university as the first account 102(1) may view the first account 102(1)'s pictures, but that other account who are family members of the first account 102(1) may not view those same pictures.

In particular examples, the social networking system 106 may provide one or more default privacy settings for each object of a particular object-type. A privacy setting for an object that is set to a default may be changed by an account associated with that object. As an example, and not by way of limitation, all images posted by a first account 102(1) may have a default privacy setting of being visible only to friends of the first account 102(1) and, for a particular image, the first account 102(1) may change the privacy setting for the image to be visible to friends and friends-of-friends.

In particular examples, privacy settings may allow a first account 102(1) to specify (e.g., by opting out, by not opting in) whether the social networking system 106 may receive, collect, log, or store particular objects or information associated with the account for any purpose. In particular examples, privacy settings may allow the first account 102(1) to specify whether particular applications or processes may access, store, or use particular objects or information associated with the account. The privacy settings may allow the first account 102(1) to opt in or opt out of having objects or information accessed, stored, or used by specific applications or processes. The social networking system 106 may access such information in order to provide a particular function or service to the first account 102(1), without the social networking system 106 having access to that information for any other purposes. Before accessing, storing, or using such objects or information, the social networking system 106 may prompt the account to provide privacy settings specifying which applications or processes, if any, may access, store, or use the object or information prior to allowing any such action. As an example, and not by way of limitation, a first account 102(1) may transmit a message to a second account via an application related to the online social network (e.g., a messaging app), and may specify privacy settings that such messages should not be stored by the social networking system 106.

In particular examples, an account may specify whether particular types of objects or information associated with the first account 102(1) may be accessed, stored, or used by the social networking system 106. As an example, and not by way of limitation, the first account 102(1) may specify that images sent by the first account 102(1) through the social networking system 106 may not be stored by the social networking system 106. As another example and not by way of limitation, a first account 102(1) may specify that messages sent from the first account 102(1) to a particular second account may not be stored by the social networking system 106. As yet another example and not by way of limitation, a first account 102(1) may specify that all objects sent via a particular application may be saved by the social networking system 106.

In particular examples, privacy settings may allow a first account 102(1) to specify whether particular objects or information associated with the first account 102(1) may be accessed from particular client systems or third-party systems. The privacy settings may allow the first account 102(1) to opt in or opt out of having objects or information accessed from a particular device (e.g., the phone book on an account's smart phone), from a particular application (e.g., a messaging app), or from a particular system (e.g., an email server). The social networking system 106 may provide default privacy settings with respect to each device, system, or application, and/or the first account 102(1) may be prompted to specify a particular privacy setting for each context. As an example, and not by way of limitation, the first account 102(1) may utilize a location-services feature of the social networking system 106 to provide recommendations for restaurants or other places in proximity to the account. The first account 102(1)'s default privacy settings may specify that the social networking system 106 may use location information provided from a client device of the first account 102(1) to provide the location-based services, but that the social networking system 106 may not store the location information of the first account 102(1) or provide it to any third-party system. The first account 102(1) may then update the privacy settings to allow location information to be used by a third-party image-sharing application in order to geo-tag photos.

Privacy Settings for Mood, Emotion, or Sentiment Information

In particular examples, privacy settings may allow an account to specify whether current, past, or projected mood, emotion, or sentiment information associated with the account may be determined, and whether particular applications or processes may access, store, or use such information. The privacy settings may allow accounts to opt in or opt out of having mood, emotion, or sentiment information accessed, stored, or used by specific applications or processes. The social networking system 106 may predict or determine a mood, emotion, or sentiment associated with an account based on, for example, inputs provided by the account and interactions with particular objects, such as pages or content viewed by the account, posts or other content uploaded by the account, and interactions with other content of the online social network. In particular examples, the social networking system 106 may use an account's previous activities and calculated moods, emotions, or sentiments to determine a present mood, emotion, or sentiment. An account who wishes to enable this functionality may indicate in their privacy settings that they opt into the social networking system 106 receiving the inputs necessary to determine the mood, emotion, or sentiment. As an example, and not by way of limitation, the social networking system 106 may determine that a default privacy setting is to not receive any information necessary for determining mood, emotion, or sentiment until there is an express indication from an account that the social networking system 106 may do so. By contrast, if an account does not opt in to the social networking system 106 receiving these inputs (or affirmatively opts out of the social networking system 106 receiving these inputs), the social networking system 106 may be prevented from receiving, collecting, logging, or storing these inputs or any information associated with these inputs. In particular examples, the social networking system 106 may use the predicted mood, emotion, or sentiment to provide recommendations or advertisements to the account. In particular examples, if an account desires to make use of this function for specific purposes or applications, additional privacy settings may be specified by the account to opt in to using the mood, emotion, or sentiment information for the specific purposes or applications. As an example, and not by way of limitation, the social networking system 106 may use the account's mood, emotion, or sentiment to provide newsfeed items, pages, friends, or advertisements to an account. The account may specify in their privacy settings that the social networking system 106 may determine the account's mood, emotion, or sentiment. The account may then be asked to provide additional privacy settings to indicate the purposes for which the account's mood, emotion, or sentiment may be used. The account may indicate that the social networking system 106 may use his or her mood, emotion, or sentiment to provide newsfeed content and recommend pages, but not for recommending friends or advertisements. The social networking system 106 may then only provide newsfeed content or pages based on account mood, emotion, or sentiment, and may not use that information for any other purpose, even if not expressly prohibited by the privacy settings.

Privacy Settings for Ephemeral Sharing

In particular examples, privacy settings may allow an account to engage in the ephemeral sharing of objects on the online social network. Ephemeral sharing refers to the sharing of objects (e.g., posts, photos) or information for a finite period of time. Access or denial of access to the objects or information may be specified by time or date. As an example, and not by way of limitation, an account may specify that a particular image uploaded by the account is visible to the account's friends for the next week, after which time the image may no longer be accessible to other accounts. As another example and not by way of limitation, a company may post content related to a product release ahead of the official launch and specify that the content may not be visible to other accounts until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of an account associated with the objects or information, and may subsequently delete the objects or information, as specified by the respective privacy settings. As an example, and not by way of limitation, a first account 102(1) may transmit a message to a second account, and the social networking system 106 may temporarily store the message in a data store until the second account has viewed or downloaded the message, at which point the social networking system 106 may delete the message from the data store. As another example and not by way of limitation, continuing with the prior example, the message may be stored for a specified period of time (e.g., 2 weeks), after which point the social networking system 106 may delete the message from the data store.

Privacy Settings for Account-Authentication and Experience-Personalization Information In particular examples, the social networking system 106 may have functionalities that may use, as inputs, personal or biometric information of a user associated with an account for user-authentication or experience-personalization purposes. An account may opt to make use of these functionalities to enhance their experience on the online social network. As an example, and not by way of limitation, an account may provide personal or biometric information to the social networking system 106. The account's privacy settings may specify that such information may be used only for particular processes, such as authentication, and further specify that such information may not be shared with any third-party system or used for other processes or applications associated with the social networking system 106. As another example and not by way of limitation, the social networking system 106 may provide a functionality for an account to provide voice-print recordings to the online social network. As an example, and not by way of limitation, if an account wishes to utilize this function of the online social network, the user associated with the account may provide a voice recording of his or her own voice to provide a status update on the online social network. The recording of the voice-input may be compared to a voice print of the user associated with the account to determine what words were spoken by the account. The account's privacy setting may specify that such voice recording may be used only for voice-input purposes (e.g., to authenticate the account, to send voice messages, to improve voice recognition in order to use voice-operated features of the online social network), and further specify that such voice recording may not be shared with any third-party system or used by other processes or applications associated with the social networking system 106. As another example and not by way of limitation, the social networking system 106 may provide a functionality for an account to provide a reference image (e.g., a facial profile, a retinal scan) to the online social network. The online social network may compare the reference image against a later-received image input (e.g., to authenticate the account, to tag the account in photos). The account's privacy setting may specify that such voice recording may be used only for a limited purpose (e.g., authentication, tagging the account in photos), and further specify that such voice recording may not be shared with any third-party system or used by other processes or applications associated with the social networking system 106.

Account-Initiated Changes to Privacy Settings

In particular examples, changes to privacy settings may take effect retroactively, affecting the visibility of objects and content shared prior to the change. As an example, and not by way of limitation, a first account 102(1) may share a first image and specify that the first image is to be public to all other accounts. At a later time, the first account 102(1) may specify that any images shared by the first account 102(1) should be made visible only to a group associated with the first account 102(1). The social networking system 106 may determine that this privacy setting also applies to the first image and make the first image visible only to the first account's 102(1) group. In particular examples, the change in privacy settings may take effect only going forward. Continuing the example above, if the first account 102(1) changes privacy settings and then shares a second image, the second image may be visible only to the first account's 102(1) group, but the first image may remain visible to all accounts. In particular examples, in response to an account action to change a privacy setting, the social networking system 106 may further prompt the account to indicate whether the account wants to apply the changes to the privacy setting retroactively. In particular examples, an account change to privacy settings may be a one-off change specific to one object. In particular examples, an account change to privacy may be a global change for all objects associated with the account.

In particular examples, the social networking system 106 may determine that a first account 102(1) may want to change one or more privacy settings in response to a trigger action associated with the first account 102(1). The trigger action may be any suitable action on the online social network. As an example, and not by way of limitation, a trigger action may be a change in the relationship between a first and second account of the online social network (e.g., "un-friending" an account, changing the relationship status between the accounts). In particular examples, upon determining that a trigger action has occurred, the social networking system 106 may prompt the first account 102(1) to change the privacy settings regarding the visibility of objects associated with the first account 102(1). The prompt may redirect the first account 102(1) to a workflow process for editing privacy settings with respect to one or more entities associated with the trigger action. The privacy settings associated with the first account 102(1) may be changed only in response to an explicit input from the first account 102(1) and may not be changed without the approval of the first account 102(1). As an example and not by way of limitation, the workflow process may include providing the first account 102(1) with the current privacy settings with respect to the second account or to a group of accounts (e.g., un-tagging the first account 102(1) or second account from particular objects, changing the visibility of particular objects with respect to the second account or group of accounts), and receiving an indication from the first account 102(1) to change the privacy settings based on any of the methods described herein, or to keep the existing privacy settings.

In particular examples, an account may need to provide verification of a privacy setting before allowing the account to perform particular actions on the online social network, or to provide verification before changing a particular privacy setting. When performing particular actions or changing a particular privacy setting, a prompt may be presented to the account to remind the account of his or her current privacy settings and to ask the account to verify the privacy settings with respect to the particular action. Furthermore, an account may need to provide confirmation, double-confirmation, authentication, or other suitable types of verification before proceeding with the particular action, and the action may not be complete until such verification is provided. As an example, and not by way of limitation, an account's default privacy settings may indicate that a person's relationship status is visible to all accounts (i.e., "public"). However, if the account changes his or her relationship status, the social networking system 106 may determine that such action may be sensitive and may prompt the account to confirm that his or her relationship status should remain public before proceeding. As another example and not by way of limitation, an account's privacy settings may specify that the account's posts are visible only to friends of the account. However, if the account changes the privacy setting for his or her posts to being public, the social networking system 106 may prompt the accounts with a reminder of the account's current privacy settings of posts being visible only to friends, and a warning that this change will make all of the account's past posts visible to the public. The account may then be required to provide a second verification, input authentication credentials, or provide other types of verification before proceeding with the change in privacy settings. In particular examples, an account may need to provide verification of a privacy setting on a periodic basis. A prompt or reminder may be periodically sent to the account based either on time elapsed or a number of account actions. As an example, and not by way of limitation, the social networking system 106 may send a reminder to the account to confirm his or her privacy settings every six months or after every ten photo posts. In particular examples, privacy settings may also allow accounts to control access to the objects or information on a per-request basis. As an example, and not by way of limitation, the social networking system 106 may notify the account whenever a third-party system attempts to access information associated with the account and require the account to provide verification that access should be allowed before proceeding.

Example User Interfaces

FIG. 2A-FIG. 4B are schematic views showing example user interfaces that are usable to implement the techniques described herein for generating customized graphical elements. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the computing system 100.

Figures 2A, 2B, 2C:
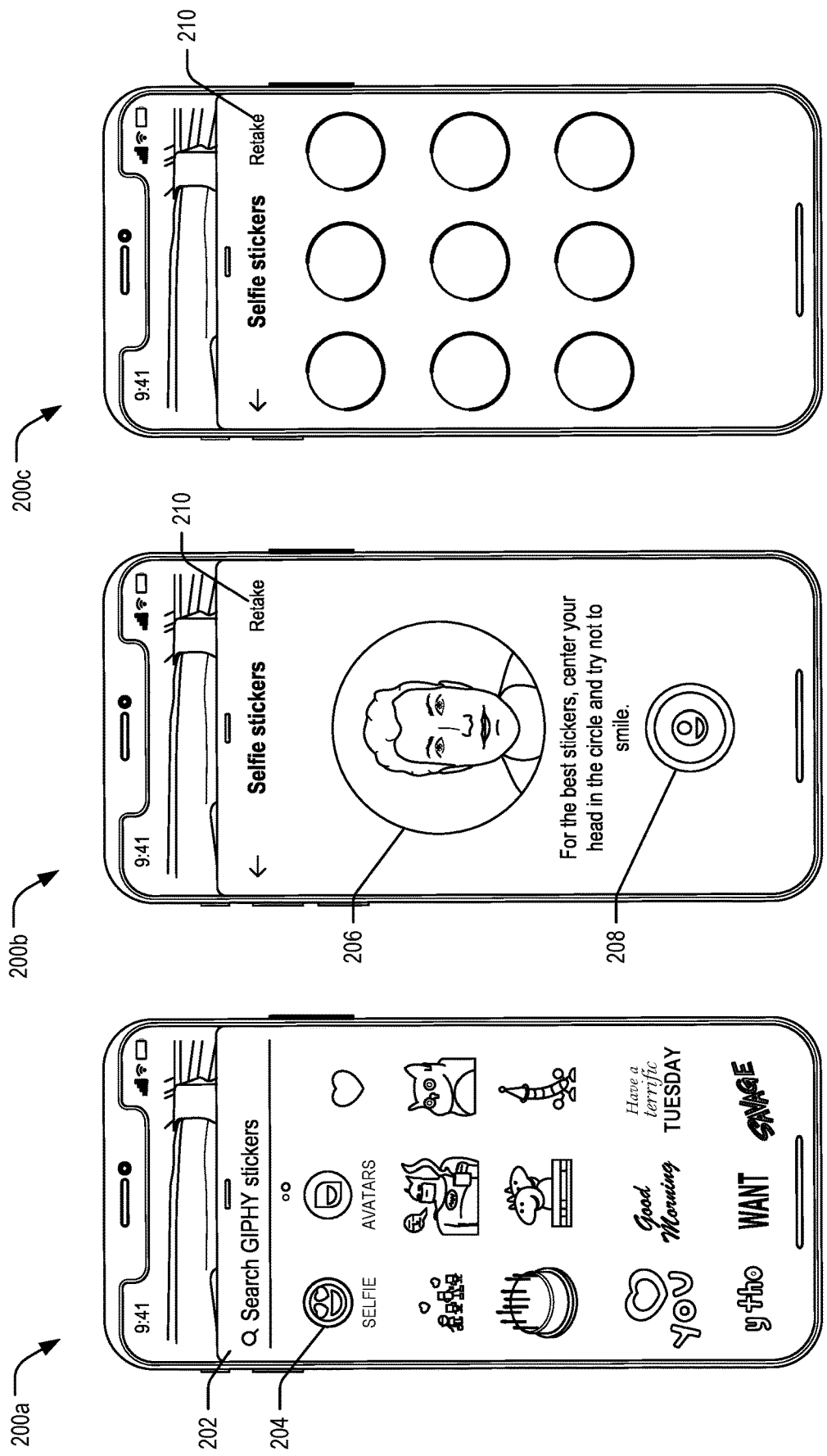
FIGS. 2A-2E illustrate example interfaces for generating a customized graphical element.
Figure 2E:
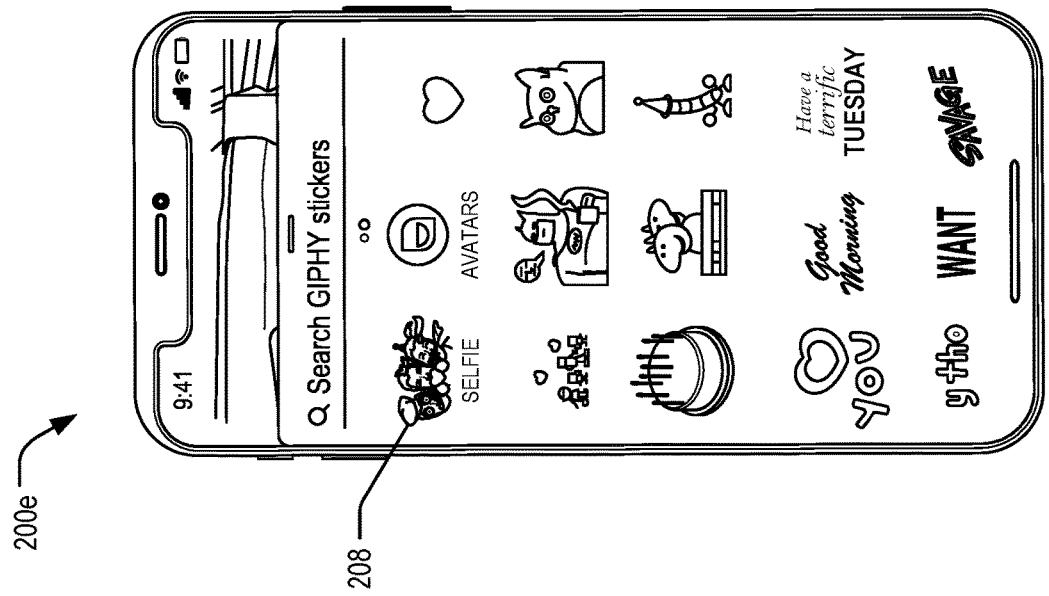

FIGS. 2A-2E illustrate example interfaces for generating a customized graphical element. FIG. 2A illustrates a user interface 200*a* depicting a sticker tray 202 including a selectable icon 204 usable to generate a customized graphical element. For example, the social networking system 106 may receive, from the first account 102(1), an indication of a selection of the selectable icon 204. The indication may include, for example, as a scroll gesture, a swipe gesture, and/or a tap gesture, to name a few examples.

Based at least in response to receiving an indication of a selection of the selectable icon 204, the social networking system 106 may present, to the first account 102(1), user interface 200*b*, illustrated in FIG. 2B, usable to receive one or more images from the first account 102(1). For example, user interface 200*b* may include a preview 206 of a front facing camera, such that the user associated with the first account 102(1) may be presented with a selfie view of themself holding the device 104(1). In some examples, the user interface 200*b* may include one or more instructions which may direct the user associated with the first account 102(1) on how to best capture an image, such as one or more prompts to center the face of the user associated with the first account 102(1), to move to a left or a right of the preview 206, or to refrain from smiling, for example. In some examples, the user interface 200*b* may include a selectable control 208 associated with capturing an image associated with the preview 206. The user interface 200*b* may also, in some examples, include a retake selectable control 210 which, upon selection by the user associated with the first account 102(1), may enable the user associated with the first account 102(1) to retake the image.

While the current illustration depicts the social networking system 106 as receiving an image via a camera associated with the device 104(1) of the first account 102(1), an image may be received by any number of means. For example, the social networking system 106 may receive an image from storage of the device 104(1) and/or a platform associated with the social networking system 106.

Based at least in part on receiving the image from the first account 102(1), the social networking system 106 may generate a face mesh of at least a portion of the face depicted in the image and may then expand the face mesh to include at least a portion of the head of the user other than the face. The social networking system 106 may then generate a customized graphical element which may include at least a portion of the face and a portion of the head of the user other than the head. For example, user interface 200*c* illustrates an example interface in which the social networking system 106 is in the process of generating the customized graphical element.

FIG. 2C illustrates an example user interface 200*c* depicting a sticker tray including multiple customized graphical elements with one or more augmented reality filters applied to the customized graphical elements. For example, the social networking system 106 may apply one or more augmented reality filters to the generated customized graphical element to obtain a modified graphical element. For example, the social networking system 106 may receive, from the first account 102(1), a request to generate one or more additional customized graphical elements, such as by selection of the selectable icon 204. The social networking system 106 may then present, to the first account 102(1), one or more available augmented reality filters usable to augment the customized graphical element, as depicted by the customized graphical element (also referred to herein as a customized graphical element) depicted in user interface 200*d*.

In some examples, the social networking system 106 may receive, from the first account 102(1), of a selection of a selected augmented reality filter from among the one or more available augmented reality filters, such as the augmented reality filter applied to the customized graphical element. The social networking system 106 may then apply the selected augmented reality filter to obtain the modified graphical element such that that the account 102(1) may apply the customized graphical element to the social networking system 106.

Figure 2D:
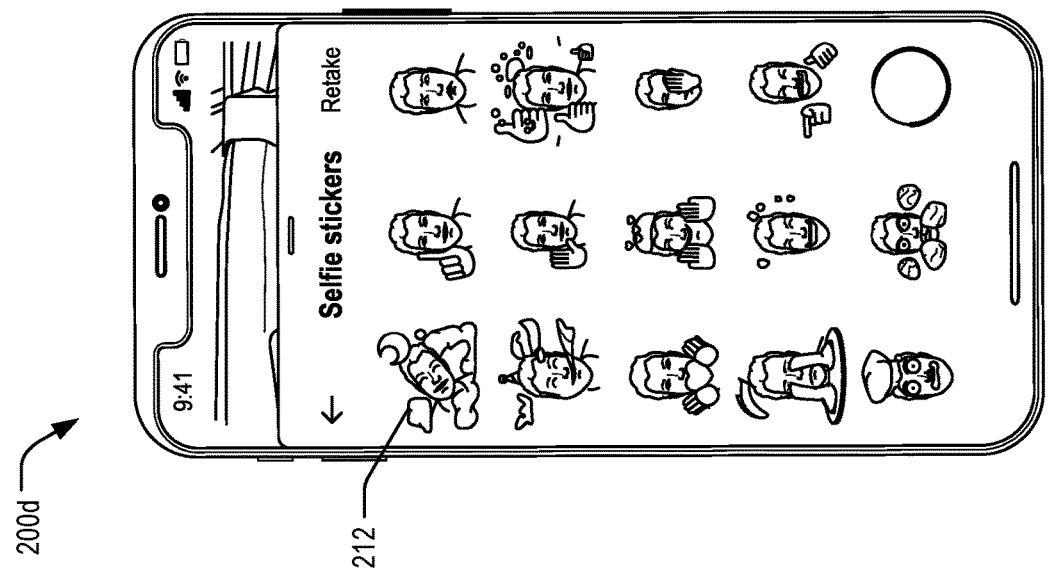

In some examples, as illustrated by user interface 200*d* in FIG. 2D, the social networking system 106 may store the modified graphical element in a sticker tray such that the first account 102(1) may access the modified graphical element for later use. In some examples, the social networking system may generate a selectable icon 212 associated with the one or more modified graphical elements. For example, the selectable icon 212 may be customized to include previews of one or more modified graphical elements. Upon a selection of the selectable icon 212 by the first account 102(1), the social networking system 106 may cause presentation of one or more modified graphical elements, such as that depicted in user interface 200*c*.

In some examples, customized graphical element and/or the modified graphical element may be applied to a content item on the social networking system 106. It may be noted that while the present example describes the application of a customized graphical element, a modified graphical element may be used additionally or alternatively. Application of the customized graphical element may take a variety of forms, as illustrated in FIGS. 3A-3C. In some examples, the customized graphical element may be applied as a sticker. For example, as illustrated in user interface 300*a* in FIG. 3A, a customized graphical element 302 may be sent as a content item via a direct message (DM) between two or more accounts, such as the first account 102(1) and a second account 102(2). Similar to that of a GIF, the customized graphical element may be used to increase aesthetic appeal and/or foster engagement with other accounts 102(*n*).

In some examples, the user interface 300*a* may include one or more selectable controls associated with generating a customized graphical element, such as selectable control 304. For example, based at least in part on sending a customized graphical element from a first account 102(1) to a second account 102(2), the social networking system 106 may determine that the second account 102(2) has not generated a customized graphical element. Thus, the social networking system 106 may provide, to the second account 102(2), one or more controls associated with generating customized graphical element, such as selectable control 304. In some examples, upon receiving an indication of a selection of the selectable control 304, the social networking system 106 may cause presentation, to the second account 102(2), of one or more interfaces usable to generate customized graphical elements, such as user interface 200*b*.

In some examples, the customized graphical element may be used as a reaction to a content item. For example, FIG. 3B illustrates a user interface 300*b* including multiple customized graphical elements, such as customized graphical element 306, which may be sent as a reaction to an image.

For example, similar to reactions such as a "love" or "dislike," customized graphical elements may be used to indicate a reaction to content, such as images, messages, feed posts, and ephemeral content items, to name a few non-limiting examples.

In other examples, a customized graphical element may be used as a content item, such as an avatar or profile photo, such as customized graphical element 308. However, this is merely an example, and a customized graphical element may be used as any content item, as described above.

In some examples, the customized graphical element may be interactive such that it may respond to an environment. For example, the social networking system 106 may associate an action with the customized graphical element such that in response to receiving an input from a second account 102(2) in association with the customized graphical element, the social networking system 106 may cause performance of the action associated with the customized graphical element in reaction to the input. In some examples, the performance of the action may be based at least in part on various factors, such as the type of content the customized graphical element is applied, and/or a relationship of the second account 102(1) to the first account 102(1). As an example, a first user associated with a first account 102(1) may react to a content item shared by a second account 102(2) by sending a customized graphical element as a reaction, such as the customized graphical element 306. The customized graphical element may be associated with an action, such as depicting the customized graphical element laughing, based at least in response to a selection of the customized graphical element by the second account 102(2). Thus, in response to a selection of the customized graphical element 306 by the second account 102(2), such as clicking on or tapping the customized graphical element 306, the customized graphical element 306 may animate to indicate it is laughing.

In some examples, as illustrated by user interface 300c in FIG. 3C, the first account 102(1) may wish to further modify the customized graphical element. For example, the social networking system 106 may receive, from the first account 102(1), a request to modify the customized graphical element (for example, via a selection of a selectable icon usable to modify the customized graphical element, not illustrated). The social networking system 106 may then cause presentation of an interface usable to modify the customized graphical element, such as user interface 310. An interface may be a separate interface and may include one or more controls associated with modifying the customized graphical element. Modifications may include a change to one or more elements of the customized graphical element, such as, for example, a change to a font (e.g., a change in a font type, a font color, a font size, a text of a font, an alignment of a text, etc.), a change to a shape (e.g., a change in a shape size, a shape color, a shape outline, etc.), or a change to an image (e.g., an image type, an image filter, an image size, an image opacity, an etc.). Modifications may also include the additional or removal of elements to the customized graphical element, such as the addition of an article of clothing or an emoji. For example, as illustrated in FIG. 3C, the user interface 310 may include one or more articles of clothing, such as sunglasses 312. In response to a selection of the sunglasses 312 by the first account 102(1), the social networking system 106 may modify the customized graphical element 314 to include the sunglasses 312.

Figure 4B:
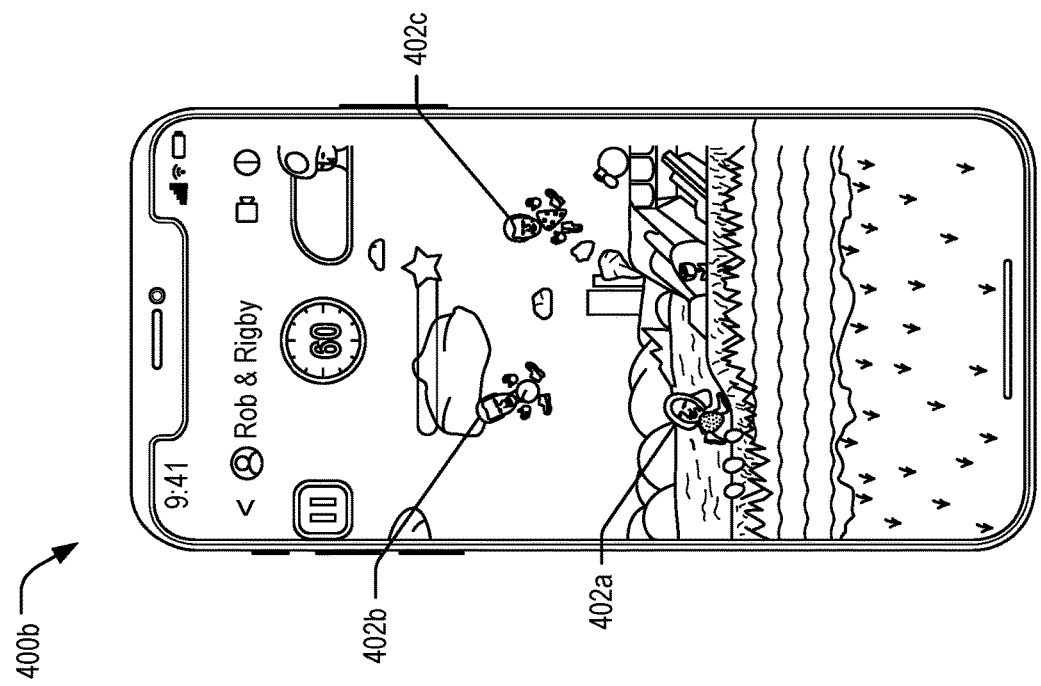
FIGS. 4A and 4B illustrate example interfaces for applying a customized graphical element in an interactive environment.
Figure 4A:
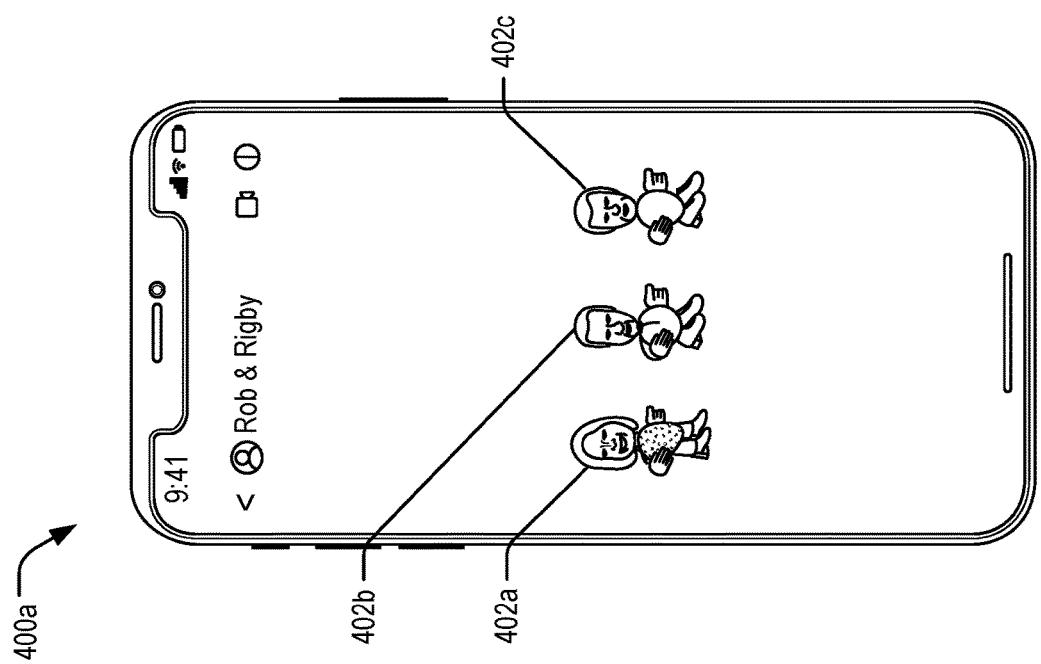

In some examples, customized graphical elements may interact with an environment. For example, FIGS. 4A and 4B illustrate customized graphical elements illustrated as avatars in a game environment. For example, user interface 400a, illustrated in FIG. 4A, depict customized graphical elements 402a, 402b, and 402c, each of which may correspond to a user associated with an account, such as a first account 102(1), a second account 102(2), and a third account 102(3). In some examples, the customized graphical elements 402a, 402b, and 402c may be used as avatars to interact in an environment, such as an interactive game, as illustrated in user interface 400b in FIG. 4B. For example, users associated with a first account 102(1), a second account 102(2), and a third account 102(3) may be engaged in a game, wherein the users associated with the first account 102(1), the second account 102(2), and the third account 102(3) may be represented by their respective customized graphical elements 402a, 402b, and 402c. The accounts 102(1)-102(3) may control their respective customized graphical elements 402a, 402b, and 402c as they play the game in the user interface 400b, wherein the customized graphical elements 402a, 402b, and 402c may react to scenarios in the game environment. This may include, for example, the customized graphical elements 402a, 402b, and 402c changing facial expressions (e.g., crying, laughing, smiling, grimacing, etc.), moving (e.g., running, jumping, sliding, etc.), interacting with the environment (e.g., picking up an object, dropping an object, ducking from an object, running into an object, etc.) and/or interacting with one another (e.g., running into one another, waving to one another, high-fiving one another, etc.), to name a few non-limiting examples. In this way, users associated with accounts 102(n) are afforded an online experience in which they may further curate and customize their interactions with one and another.

Example Methods

Various methods are described with reference to the example system of FIG. 1 for convenience and ease of understanding. However, the methods described are not limited to being performed using the system of FIG. 1 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

Figure 5A:
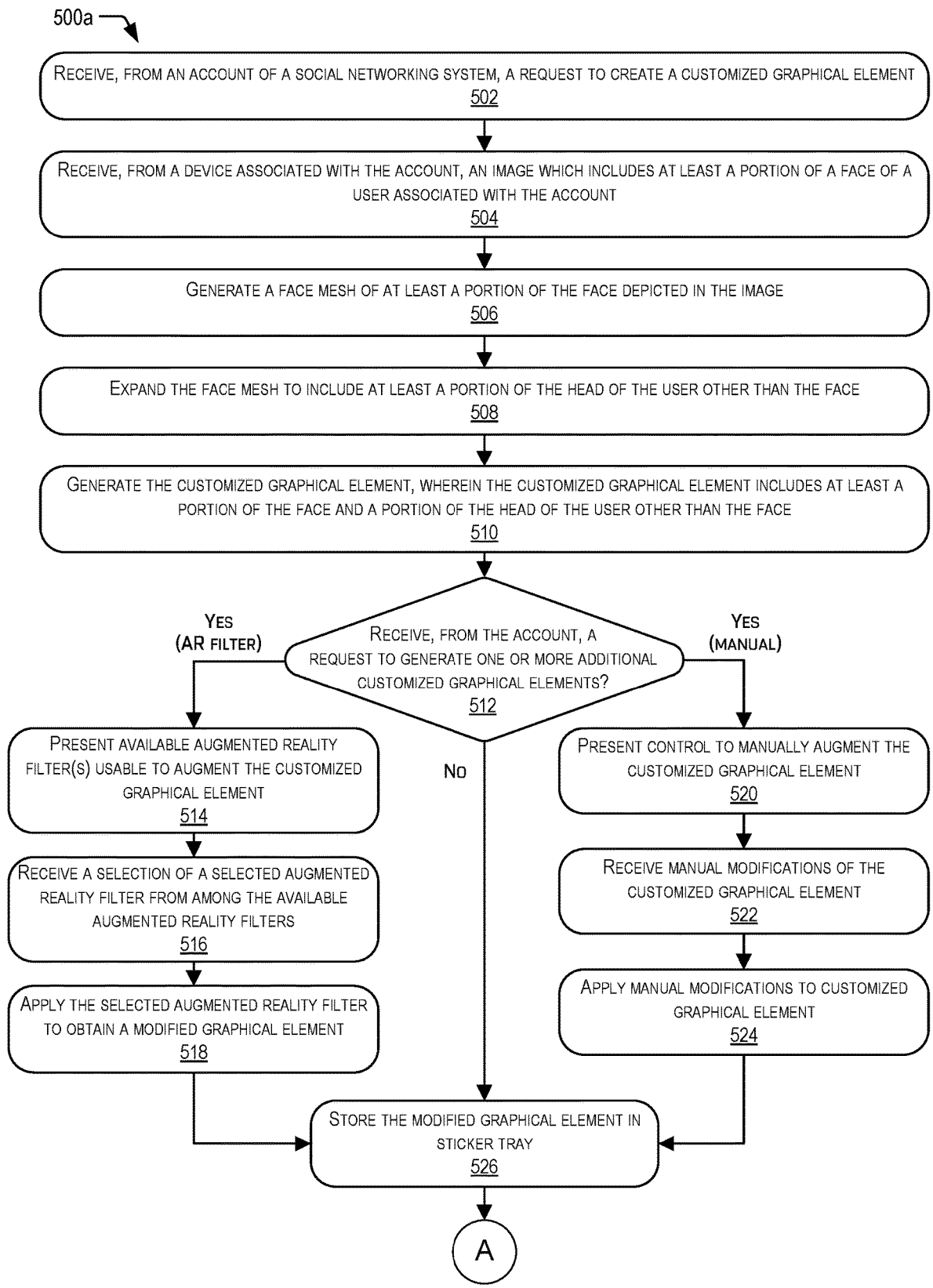
FIGS. 5A and 5B illustrate example processes for generating, modifying, and sharing custom graphical elements.

FIG. 5A depicts an example process 500a for generating a customized graphical element including one or more augmentations. For example, at operation 502, the process may include receiving, from a first account of a social networking system, a request to create a customized graphical element. The request may include, for example, a scroll gesture, a swipe gesture, and/or a tap gesture, to name a few examples.

At operation 504, the process 500a may include at least receiving, from a device associated with the first account, an image, wherein the image includes at least a portion of a face of a user associated with the first account. The image may be supplied from storage of a device of a user associated with the first account and/or from a camera of the device. Additionally or alternatively, the image may be supplied from a platform associated with the social networking system, such as an image previously received from the first account on a first platform and/or a second platform of the social networking system.

At operation 506, the process 500a may include at least generating, by the social networking system, a face mesh of at least a portion of the face depicted in the image. The face mesh may be a 3-dimensional (3D) model of a face taken from an image of a face which may create a surface that reconstructs one or more expressions of an individual. In some examples, social networking system may utilize applications such as a face tracker and/or Spark AR Studio to generate the face mesh, which may include one or more facial features.

At operation 508, the process 500a may include at least expanding the face mesh to include at least a portion of the head of the user associated with the first account other than the face. For example, the face mesh may include a portion of a face of the user associated with the first account to include at least an area below eyebrows of the user, along cheekbones of the user, and/or to a chin of the user. Thus, expanding the face mesh to include at least a portion of the head of the user other than the face may include expanding the face mesh to include, for example, hair and/or ears of the user, allowing the social networking system to capture recognizable and distinguishing physical qualities of a user, generating an accurate face mesh of a user and their dominant features.

At operation 510, the process 500a may include at least generating the customized graphical element, wherein the customized graphical element includes at least a portion of the face and a portion of the head of the user other than the face.

At operation 512, the process 500a may include determining that the social networking system has received, from the first account, a request to generate one or more additional customized graphical elements. In some examples, an indication to generate one or more additional customized graphical elements may present as multiple options, such as applying one or more augmented reality (AR) filters (operation 514), and/or manually augmented the customized graphical element (operation 520).

At operation 514 (indicated by "YES (AR Filter)"), upon determining that the social networking system did receive, from the first account, a request to generate one or more additional customized graphical elements via AR filters, the process 500a may include presenting available augmented reality filter(s) usable to augment the customized graphical element. An augmented reality filter may be a computer generated effect which may be superimposed on one or more images. For example, an augmented reality filter may include one or more aminated graphics applied to the foreground and/or background of an image to add one or more layers of imagery. However, an augmented reality filter may additionally and/or alternatively include a static image, such as a graphic, a drawing, an image, or a sticker, to name a few examples At operation 516, the process 500a may include receiving, from the first account, a selection of a selected augmented reality filter from among the one or more available augmented reality filters.

At operation 518, the process 500a may include applying the selected augmented reality filter to obtain a modified graphical element. For example, the modified graphical element may include the customized graphical element including the selected augmented reality filter.

At operation 520 (indicated by "YES (Manual)"), upon determining that the social networking system did receive, from the first account, a request to generate one or more additional customized graphical elements manually, the process 500a may include presenting, by the social networking system and to the first account, a control to manually augment the customized graphical element. For example, rather than presenting options of one or more augmented reality filters which may be applied to the customized graphical element by the social networking system, the first account may have the option to manually apply one or more augmentations to the customized graphical element.

At operation 522, the process 500a may include receiving, from the first account, one or more manual modifications of the customized graphical element. Modifications may include any change to one or more elements of the customized graphical element. For example, a customized graphical element may have multiple elements, such as one or more shapes, texts, or images. Thus, a modification to a customized graphical element may include a change to a font (e.g., a change in a font type, a font color, a font size, a text of a font, an alignment of a text, etc.), a change to a shape (e.g., a change in a shape size, a shape color, a shape outline, etc.), or a change to an image (e.g., an image type, an image filter, an image size, an image opacity, an etc.). Modifications may also include a change to a relationship between elements, such as bringing an element to a foreground or moving an element to a background or animating an element. Additionally, modifications may include an addition of and/or a removal of an element. For example, a modification may include an addition of a drawing (e.g., a free-hand drawing), an addition of audio (e.g., at least a portion of a song, a voice recording, etc.), an addition of a new customized graphical element (e.g., an item of clothing, a facial feature, an accessory, etc.), and/or a removal of at least a portion of an element, to name a few examples.

At operation 524, the process 500a may include applying, by the social networking system, the one or more manual modifications to the customized graphical element. Thus, the user associated with the first account is afforded the flexibility to customize the customized graphical element to the user associated with the first account's liking and preference.

At operation 526 (indicated by "NO"), upon determining that the social networking system did not receive, from the first account, a request to generate one or more additional customized graphical elements manually, the process 500a may include storing the modified graphical element in the sticker tray such that the user associated with first account may easily access the modified graphical element for later use.

Figure 5B:
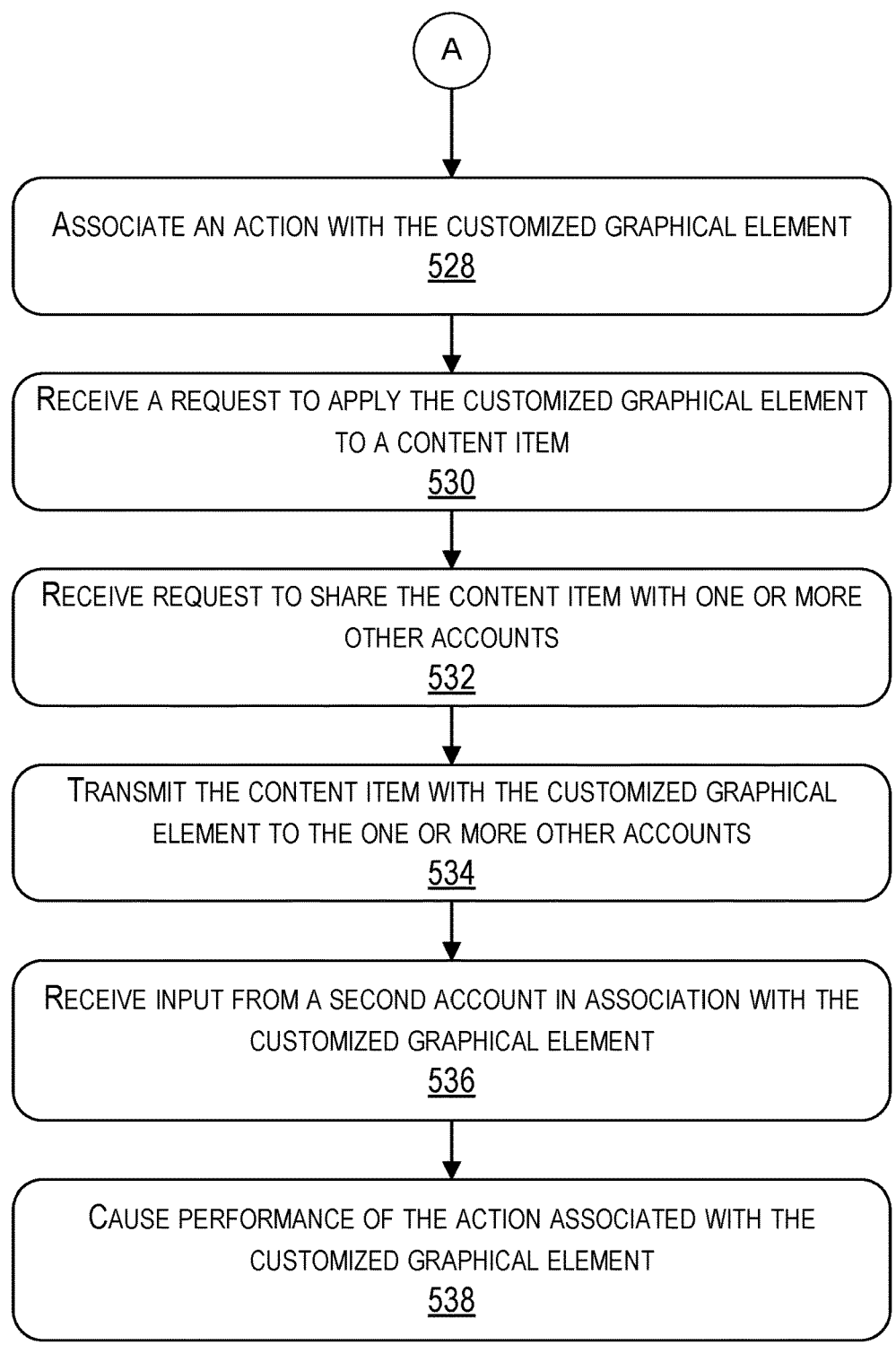

FIG. 5B depicts an example process 500b for associating an action with a customized graphical element. It may be noted that while the current process describes an action associated with a customized graphical element, the process may additionally or alternatively apply to a modified graphical element, such as that described at operations 518, 526, and 524 in process 500a in FIG. 5A, above.

For example, at operation 528, the process 500b may include associating, by the social networking system, an action with the customized graphical element. An action may include, a selection of the customized graphical element, such as a double tap, a like, or a comment, to name a few non-limiting examples.

At operation 530, the process 500b may include receiving, at the social networking system and from the first account, a request to apply the customized graphical element to a content item. Content, such as a content item, may take a variety of forms. For example, content may include a profile or feed post, a story, a direct message to one or more other accounts, a reel, a tweet, or a snap, to name a few examples. Thus, the customized graphical element may take many forms when applied to a content item. For example, the customized graphical element may be a sticker, which may be a graphic design element. In other examples, the customized content item may animation, such as a GIF. Additionally, or alternatively, the customized graphical element may be configured to interact with and respond to elements of the social networking system.

At operation 532, the process 500b may include receiving, at the social networking system and from the first account, a request to share the content item, including the customized graphical element with one or more other accounts of the social networking system. The one or more other accounts of the social networking system may include, for example, friends and/or followers of the first account, such as a second account.

At operation 534, the process 500b may include transmitting, by the social networking system, the content item with the customized graphical element to the one or more other accounts. For example, and as described above, the social networking system may send, to the second account, a direct message, a feed post, a story, or a comment, to name a few non-limiting examples.

At operation 536, the process 500b may include receiving, at the social networking system and from a second account of the social networking system, input in association with the customized graphical element. For example, continuing with the illustrative example above, the user associated with the second account may tap the customized graphical element.

At operation 532, the process 500b may include causing performance of the action associated with the customized graphical element. For example, the social networking system, based at least in part on receiving an indication that the user associated with the second account tapped on the customized content item, may cause the customized content item to "wave" to the second account.

Example System and Device

Figure 6:
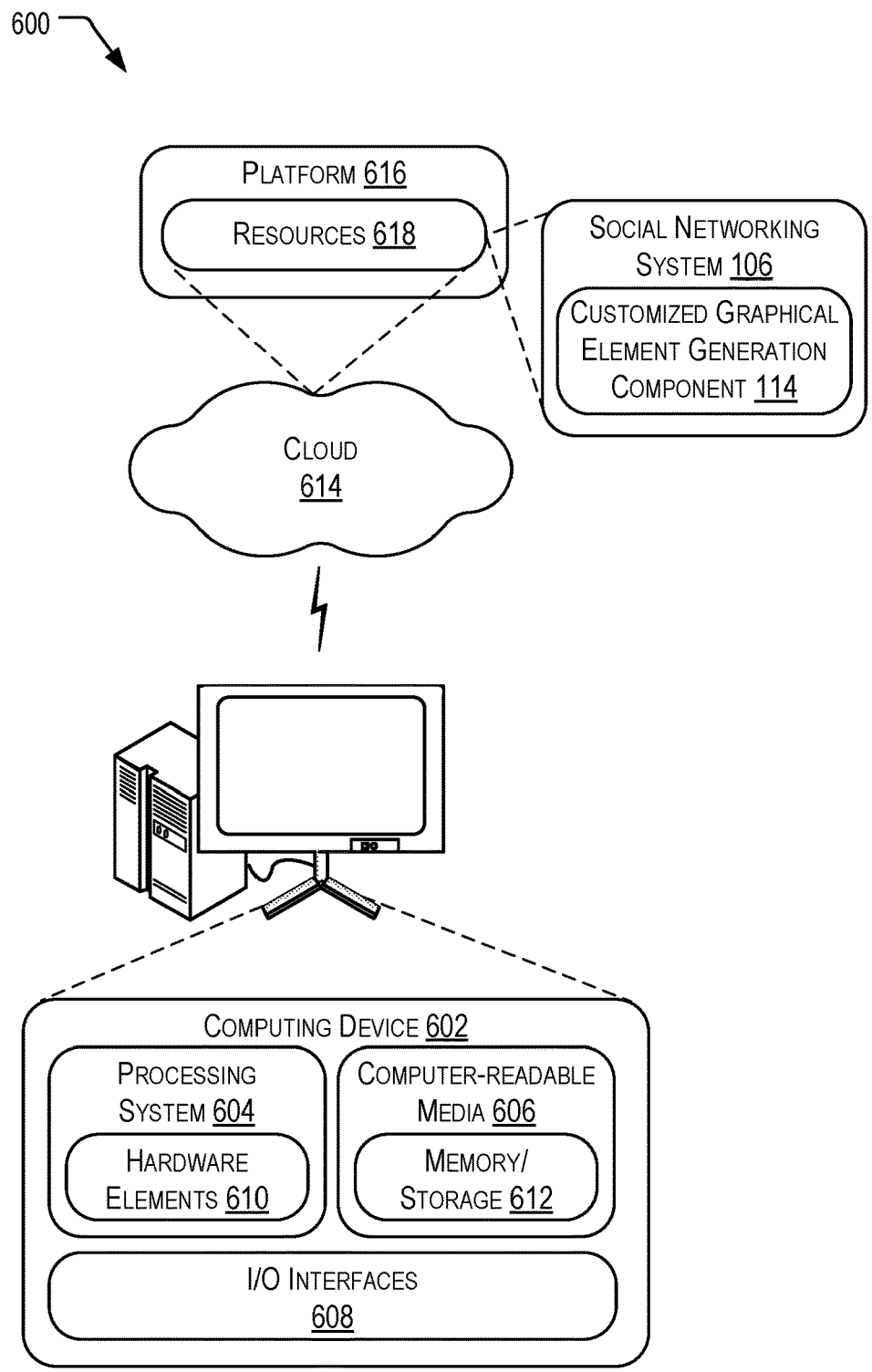
FIG. 6 illustrates an example system and device which may be used to implement the techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage component 612. The memory/storage component 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 602. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 602, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 610 and computer-readable media 606 are representative of modules, programmable device logic and/or device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also be scalable to provide a corresponding level of scale to encountered demand for the resources 618 that are implemented via the platform 616. Accordingly, in an interconnected device embodiment, implementation of functionality described herein may be distributed throughout multiple devices of the system 600. For example, the functionality may be implemented in part on the computing device 602 as well as via the platform 616 which may represent a cloud computing environment or "cloud" 614.

The example systems and methods of the present disclosure overcome various deficiencies of known prior art devices. Other examples of the present disclosure will be apparent to those skilled in the art from consideration of the specification and practice of the disclosure contained herein. It is intended that the specification and examples be considered as example only, with a true scope and spirit of the present disclosure being indicated by the following claims.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, from an account of a social networking system, a request to create a customized graphical element;
   receiving, from a device associated with the account, an image, wherein the image includes at least a portion of a face of a user associated with the account;
   generating a face mesh of at least the portion of the face depicted in the image;
   expanding the face mesh to include a portion of a head of the user other than the face;

generating the customized graphical element, wherein the customized graphical element includes at least the portion of the face and the portion of the head of the user other than the face;

associating an action with the customized graphical element; and causing performance of the action associated with the customized graphical element based at least in part on a type of content to which the customized graphical element is applied.

2. The method of claim 1, wherein generating the customized graphical element further includes normalizing the face mesh to at least one of center, rotate, or resize the face mesh.

3. The method of claim 1, further comprising:
receiving a request to generate one or more additional customized graphical elements;
presenting one or more available augmented reality filters usable to augment the customized graphical element;
receiving a selection of a selected augmented reality filter from among the one or more available augmented reality filters; and
applying the selected augmented reality filter to obtain a modified graphical element; and
storing the modified graphical element in a sticker tray.

4. The method of claim 1, wherein the account is a first account, the method further comprising:
receiving, from the first account, a request to apply the customized graphical element to content item;
wherein the customized graphical element includes at least one of: an ephemeral content item; a reaction to an ephemeral content item; a reaction to a comment; a reaction to a direct message; or a game avatar.

5. The method of claim 1, wherein the account is a first account, the method further comprising:
receiving input from a second account in association with the customized graphical element; and
causing performance of the action associated with the customized graphical element in reaction to the input from the second account.

6. The method of claim 5, wherein the action is one of multiple actions, and causing performance of the action associated with the customized graphical element in reaction to the input from the second account is based at least in part on at least one of:
a relationship of the second account to the first account.

7. The method of claim 1, further comprising:
receiving, from the account, a request to modify the customized graphical element;
causing presentation of an interface including a control usable to modify the customized graphical element;
receiving user input via the control to modify the customized graphical element to obtain one or more modified graphical elements; and
storing the one or more modified graphical elements in association with the customized graphical element in a sticker tray.

8. The method of claim 7, wherein the one or more modified graphical elements include modifications to at least one of:
add an item of clothing to the customized graphical element;
remove an item of clothing from the customized graphical element;
add a facial feature to the customized graphical element; or remove a facial feature from the customized graphical element.

9. A system comprising:
one or more processors; and
computer-readable media storing instructions that, when executed by the one or more processors, cause the system to perform operations comprising:
receiving, from an account of a social networking system, a request to create a customized graphical element;
receiving, from a device associated with the account, an image, wherein the image includes at least a portion of a face of a user associated with the account;
generating a face mesh of at least the portion of the face depicted in the image;
expanding the face mesh to include a portion of a head of the user other than the face;
generating the customized graphical element, wherein the customized graphical element includes at least the portion of the face and the portion of the head of the user other than the face;
associating an action with the customized graphical element; and
causing performance of the action associated with the customized graphical element based at least in part on a type of content to which the customized graphical element is applied.

10. The system of claim 9, wherein generating the customized graphical element further includes normalizing the face mesh to at least one of center, rotate, or resize the face mesh.

11. The system of claim 9, further comprising:
receiving a request to generate one or more additional customized graphical elements;
presenting one or more available augmented reality filters usable to augment the customized graphical element;
receiving a selection of a selected augmented reality filter from among the one or more available augmented reality filters; and
applying the selected augmented reality filter to obtain a modified graphical element; and
storing the modified graphical element in a sticker tray.

12. The system of claim 9, wherein the account is a first account, the system further comprising:
receiving, from the first account, a request to apply the customized graphical element to content item; and
wherein the customized graphical element includes at least one of: an ephemeral content item; a reaction to an ephemeral content item; a reaction to a comment; a reaction to a direct message; or a game avatar.

13. The system of claim 9, wherein the account is a first account, the system further comprising:
receiving input from a second account in association with the customized graphical element; and
causing performance of the action associated with the customized graphical element in reaction to the input from the second account.

14. The system of claim 13, wherein the action is one of multiple actions, and causing performance of the action associated with the customized graphical element in reaction to the input from the second account is based at least in part on
a relationship of the second account to the first account.

15. One or more non-transitory computer-readable media storing instructions that, when executed by one or more processors of a server computing device, cause the server computing device to perform operations comprising:

receiving, from an account of a social networking system, a request to create a customized graphical element;

receiving, from a device associated with the account, an image, wherein the image includes at least a portion of a face of a user associated with the account;

generating a face mesh of at least the portion of the face depicted in the image;

expanding the face mesh to include a portion of a head of the user other than the face;

generating the customized graphical element, wherein the customized graphical element includes at least the portion of the face and the portion of the head of the user other than the face;

associating an action with the customized graphical element; and causing performance of the action associated with the customized graphical element based at least in part on a type of content to which the customized graphical element is applied.

16. The one or more non-transitory computer-readable media of claim 15, the operations further comprising:

receiving, from the account, a request to modify the customized graphical element;

causing presentation of an interface including a control usable to modify the customized graphical element;

receiving user input via the control to modify the customized graphical element to obtain one or more modified graphical elements; and storing the one or more modified graphical elements in association with the customized graphical element in a sticker tray.

17. The one or more non-transitory computer-readable media of claim 16, wherein the one or more modified graphical elements include modifications to at least one of:

add an item of clothing to the customized graphical element;

remove an item of clothing from the customized graphical element;

add a facial feature to the customized graphical element; or remove a facial feature from the customized graphical element.

18. The one or more non-transitory computer-readable media of claim 15, wherein generating the customized graphical element further includes normalizing the face mesh to at least one of center, rotate, or resize the face mesh.

19. The one or more non-transitory computer-readable media of claim 15, the operations further comprising:

receiving a request to generate one or more additional customized graphical elements;

presenting one or more available augmented reality filters usable to augment the customized graphical element;

receiving a selection of a selected augmented reality filter from among the one or more available augmented reality filters; and applying the selected augmented reality filter to obtain a modified graphical element; and storing the modified graphical element in a sticker tray.

20. The one or more non-transitory computer-readable media of claim 15, wherein the account is a first account, the operations further comprising:

receiving, from the first account, a request to apply the customized graphical element to content item; and wherein the customized graphical element includes at least one of: an ephemeral content item; a reaction to an ephemeral content item; a reaction to a comment; a reaction to a direct message; or a game avatar.

\* \* \* \* \*